US011056893B2

(12) United States Patent
Hiroe et al.

(10) Patent No.: US 11,056,893 B2
(45) Date of Patent: Jul. 6, 2021

(54) CHARGING APPARATUS (71) Applicant: Toyota Jidosha Kabushiki Kaisha, Toyota (JP)

(72) Inventors: Yoshihiko Hiroe, Toyota (JP); Tomoya Ono, Toyota (JP); Hidetoshi Kusumi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 153 days.

(21) Appl. No.: 16/219,115

(22) Filed: Dec. 13, 2018

(65) Prior Publication Data
US 2019/0199108 A1 Jun. 27, 2019

(30) Foreign Application Priority Data
Dec. 27, 2017 (JP) .............................. JP2017-251945

(51) Int. Cl.
H03J 7/00 (2006.01)
H02J 7/00 (2006.01)
(Continued)

(52) U.S. Cl.
CPC .............. H02J 7/0024 (2013.01); B60L 53/11 (2019.02); B60L 58/19 (2019.02); B60L 58/21 (2019.02);
(Continued)

(58) Field of Classification Search
CPC .......... B60L 50/60; B60L 58/19; B60L 58/21; B60L 58/12; B60L 53/11; B60L 53/20; B60L 53/62; B60L 53/14; B60L 58/15; H02J 7/0024; H02J 7/00; H02J 7/0029; H02J 7/0021; H02J 7/1423; H02J 2310/48; H02J 7/0019; H02J 7/0026; H02J 7/0031;
(Continued)

(56) References Cited

U.S. PATENT DOCUMENTS 6,034,506 A 3/2000 Hall
6,411,063 B1 * 6/2002 Kouzu .................. H01M 10/46
320/150
(Continued)

FOREIGN PATENT DOCUMENTS

DE 102014004790 A1 10/2015
EP 3459786 A1 3/2019
(Continued)

OTHER PUBLICATIONS

Office Action dated Aug. 20, 2020 in U.S. Appl. No. 16/251,700.
(Continued)

Primary Examiner — Helen Rossoshek
(74) Attorney, Agent, or Firm — Dinsmore & Shohl LLP (57) ABSTRACT A charging apparatus includes a plurality of batteries, a changeover relay that can be changed over between a first state where the plurality of the batteries are connected in series to one another and a second state where the plurality of the batteries are connected in parallel to one another, an electric storage device, a main relay that is provided between the electric storage device and an electric load of a vehicle, and a control device that controls the opening/closing of the changeover relay. The control device renders the changeover relay in the first state when the main relay is in an open state.

5 Claims, 9 Drawing Sheets (51) Int. Cl.
*H01M 10/44* (2006.01)
*B60L 53/10* (2019.01)
*B60L 58/19* (2019.01)
*B60L 58/21* (2019.01)

(52) U.S. Cl.
CPC ......... *H01M 10/441* (2013.01); *H02J 7/0021* (2013.01)

(58) Field of Classification Search
CPC ...... H02J 7/0063; H02J 7/0068; H02J 7/0018; H02J 7/007; H02J 7/0013; H02J 7/00302; H02J 7/00304; H02J 7/00306; H02J 7/0086; H02J 7/0091; H02J 7/04; H02J 9/061; H01M 10/441
See application file for complete search history.

(56) References Cited

U.S. PATENT DOCUMENTS

| | | | |
|---|---|---|---|
| 6,781,343 B1 * | 8/2004 | Demachi | H01M 10/441 320/101 |
| 7,692,404 B2 | 4/2010 | Harris | |
| 9,731,619 B2 | 8/2017 | Tashiro et al. | |
| 10,236,802 B2 * | 3/2019 | Botts | H01M 10/482 |
| 10,305,298 B2 * | 5/2019 | Kristensen | H02J 7/0016 |
| 10,427,547 B2 * | 10/2019 | Syouda | H02J 7/0027 |
| 10,442,309 B2 * | 10/2019 | Goetz | B60L 58/22 |
| 10,630,086 B2 * | 4/2020 | Hsu | B60L 58/16 |
| 10,661,679 B2 * | 5/2020 | Botts | B60L 58/12 |
| 10,710,469 B2 * | 7/2020 | Koerner | H02J 7/345 |
| 2005/0035737 A1 * | 2/2005 | Elder | H01M 10/0413 320/103 |
| 2012/0013180 A1 | 1/2012 | Muto et al. | |
| 2012/0313584 A1 * | 12/2012 | Sugiyama | B60L 53/14 320/119 |
| 2014/0210405 A1 * | 7/2014 | Yang | H02J 50/10 320/108 |
| 2014/0312828 A1 | 10/2014 | Vo et al. | |
| 2016/0006377 A1 | 1/2016 | Hashimoto | |
| 2017/0368958 A1 * | 12/2017 | Eun | H02J 7/00 |
| 2018/0037132 A1 * | 2/2018 | Chen | H02J 7/0063 |
| 2018/0226905 A1 * | 8/2018 | Botts | H01M 10/482 |
| 2019/0061551 A1 | 2/2019 | Knobel et al. | |
| 2019/0089023 A1 * | 3/2019 | Sastry | H01M 4/131 |
| 2019/0103750 A1 * | 4/2019 | Kristensen | H02J 7/0016 |
| 2019/0126761 A1 * | 5/2019 | Verbridge | H01M 10/482 |
| 2019/0199248 A1 * | 6/2019 | Botts | H02J 7/0047 |
| 2019/0225095 A1 * | 7/2019 | Hiroe | B60L 53/20 |
| 2019/0270391 A1 * | 9/2019 | Kahnt | H02J 7/1461 |
| 2020/0070667 A1 * | 3/2020 | Wang | B60L 53/62 |
| 2020/0086761 A1 * | 3/2020 | Hamada | B60L 53/80 |
| 2020/0185936 A1 * | 6/2020 | Oishi | B60L 58/19 |
| 2020/0274370 A1 | 8/2020 | Krieg | |
| 2020/0412164 A1 * | 12/2020 | Miller | H02J 7/0068 |

FOREIGN PATENT DOCUMENTS

| | | |
|---|---|---|
| EP | 3505391 A1 | 7/2019 |
| EP | 3514000 A1 | 7/2019 |
| JP | H03203501 A | 9/1991 |
| JP | 2007-098981 A | 4/2007 |
| JP | 2013-081316 A | 5/2013 |
| JP | 2016-013819 A | 1/2016 |
| WO | 2017/186370 A1 | 11/2017 |

OTHER PUBLICATIONS

U.S. Appl. No. 16/251,700, filed Jan. 18, 2019; Inventors: Yoshihiko Hiroe et al.
Notice of Allowance dated Dec. 14, 2020 in U.S. Appl. No. 16/251,700.

* cited by examiner

CHARGING APPARATUS

CROSS-REFERENCE TO RELATED APPLICATIONS

This application claims priority to Japanese Patent Application No. 2017-251945 filed on Dec. 27, 2017, which is incorporated herein by reference in its entirety including the specification, drawings and abstract.

BACKGROUND

1. Technical Field

The present disclosure relates to a charging apparatus that can charge an electric storage device mounted in a vehicle by an electric power supply outside the vehicle.

2. Description of Related Art

In Japanese Patent Application Publication No. 2013-81316 (JP 2013-81316 A), there is disclosed a vehicle that is equipped with an electric storage device configured to be chargeable by receiving an electric power that is supplied from an electric power supply outside the vehicle. The electric storage device with which this vehicle is equipped includes a plurality of assembled batteries, and a relay that is changed over between a first state where the plurality of the assembled batteries are connected in series to one another and a second state where the plurality of the assembled batteries are connected in parallel to one another. This relay is configured such that the state thereof is changed over based on a temperature of the electric storage device and a state of charge (an SOC) of the electric storage device or the like.

SUMMARY

There is a DC charging facility that supplies a DC electric power (hereinafter referred to also as "DC Charging") to an electric storage device mounted in an electrically operated vehicle such as an electric vehicle, a plug-in hybrid vehicle or the like (hereinafter referred to simply as "a vehicle" as well). In recent years, with a view to reducing the time needed to charge the electric storage device mounted in the vehicle, an attempt to increase the electric power of the DC charging facility has been under way. The charging of the electric storage device mounted in the vehicle will be hereinafter referred to also as "the charging of the vehicle".

When the charging electric power that is supplied to the vehicle from the DC charging facility becomes large, the energization current also becomes large. When the energization current becomes large, the loss resulting from heat generation by cables, components and the like through which the charging current flows at the time of charging (hereinafter referred to also as "energized components") becomes large. As a result, the charging efficiency may decrease.

In a charging apparatus disclosed in Japanese Patent Application Publication No. 2013-81316 (JP 2013-81316 A), the vehicle is charged with the relay in either the first state or the second state, based on the temperature of the electric storage device and the SOC of the electric storage device or the like. In the second state, the inter-terminal voltage of the electric storage device is lower than in the first state. Therefore, in the case where DC charging is carried out with the same charging electric power, the charging voltage must be made lower when the vehicle is charged in the second state than when the vehicle is charged in the first state. As a result, the energization current becomes large. When the energization current becomes large, the loss resulting from heat generation by the energized components becomes large, so the charging efficiency may significantly decrease.

The present disclosure provides a charging apparatus that can enhance the charging efficiency in charging an electric storage device mounted in a vehicle by an electric power supply outside the vehicle.

A charging apparatus according to an aspect of this disclosure includes a plurality of batteries, a changeover relay that can be changed over between a first state where the plurality of the batteries are connected in series to one another and a second state where the plurality of the batteries are connected in parallel to one another, an electric storage device that is configured to be chargeable by receiving an electric power that is supplied from an electric power supply outside a vehicle, a main relay that is provided between the electric storage device and an electric load of the vehicle, and a control device that controls the opening/closing of the changeover relay. The control device renders the changeover relay in the first state when the main relay is in an open state. Besides, in the aforementioned aspect, the control device may render the main relay in the open state when a utilization ending operation for the vehicle is performed.

According to the aforementioned configuration, when the main relay is in the open state, the plurality of the batteries are connected in series to one another. When the main relay is in the open state, no electric power can be supplied from the electric storage device to the electric load of the vehicle (a drive unit), so there is established a state where the vehicle cannot run (hereinafter referred to also as "a READY-OFF state"). That is, in the READY-OFF state, the plurality of the batteries are connected in series to one another. The inter-terminal voltage of the electric storage device is higher in the case where the plurality of the batteries are connected in series to one another than in the ease where the plurality of the batteries are connected in parallel to one another. Therefore, in the case where the vehicle is charged with the same charging electric power in the READY-OFF state, the charging voltage is higher and the energization current can be made smaller when the vehicle is charged with the plurality of the batteries connected in series to one another than when the vehicle is charged with the plurality of the batteries connected in parallel to one another, in consequence, the charging efficiency can be enhanced by reducing the loss resulting from heat generation by the energized components.

In the aforementioned aspect, the control device may render the changeover relay in the first state when the main relay is in a closed state and an operation for charging the electric storage device is performed.

According to the aforementioned configuration, when the operation for charging the electric storage device is performed even in the case where the main relay is in the closed state, the plurality of the batteries are connected in series to one another. Thus, charging is started with the plurality of the batteries connected in series to one another. Therefore, the energization current can be made small as described above, and the charging efficiency can be enhanced by reducing the loss resulting from heat generation by the energized components.

In the aforementioned aspect, the charging apparatus may be further equipped with a voltage sensor that detects a voltage of the electric storage device. The control device may charge the electric storage device when the voltage of the electric storage device is within a predetermined range in a case where the changeover relay is in the first state.

According to the aforementioned configuration, when the inter-terminal voltage of the electric storage device is within the predetermined range in the case where the changeover relay is in the first state, namely, in the case where the plurality of the batteries are connected in series to one another, charging is carried out on the assumption that charging can be normally carried out. When the main relay is in the open state, the plurality of the batteries are connected in series to one another, so the predetermined range that is compared with the inter-terminal voltage of the electric storage device can be set on the premise that the plurality of the batteries are connected in series to one another. In the case where the state of connection of the plurality of the batteries is not determined when the main relay is in the open state, the predetermined range needs to be set as a range that takes into account both series connection of the plurality of the batteries and parallel connection of the plurality of the batteries. The predetermined range can be more accurately set than in this case.

In the aforementioned configuration, the control device may learn the voltage of the electric storage device with the main relay in the open state, and the predetermined range may be determined based on the learned voltage.

According, to the aforementioned configuration, the predetermined range is determined based on the voltage of the electric storage device learned when the main relay is in the open state. When the main relay is in the open state, the plurality of the batteries are connected in series to one another. Therefore, the voltage at the time when the plurality of the batteries are connected in parallel to one another is not mixed with the learned voltage, so the voltage of the electric storage device can be accurately learned.

According to the present disclosure, the charging efficiency can be enhanced in charging the electric storage device mounted in the vehicle b the electric power supply outside the vehicle.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

The present embodiment will be described hereinafter in detail with reference to the drawings. Incidentally, like or equivalent components in the drawings are denoted by like reference symbols, and the description thereof will not be repeated.

Figure 1:
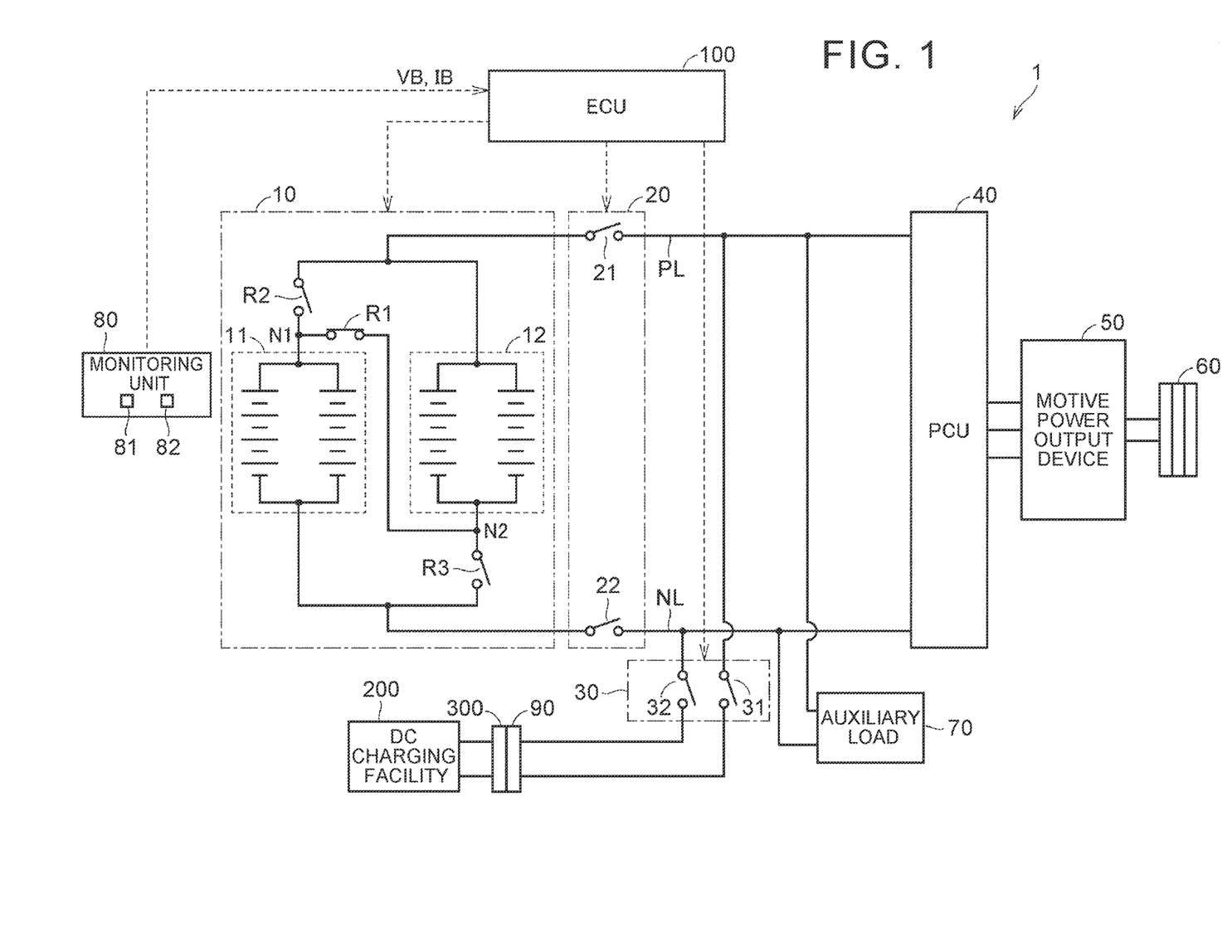
FIG. 1 is an overall configuration view of a charging system that includes a vehicle and a DC charging facility according to the present embodiment.

FIG. 1 is an overall configuration view of a charging system that includes a vehicle 1 and a DC charging facility 200 according to the present embodiment. The vehicle 1 according to the present embodiment is equipped with an electric storage device 10, a power control unit (hereinafter referred to also as "a PCU") 40, a motive power output device 50, driving wheels 60, an auxiliary load 70, an inlet 90, an electronic control unit (an ECU) 100, a main relay device 20, a charging relay device 30, and a monitoring unit 80.

The electric storage device 10 includes two assembled batteries 11 and 12 and changeover relays R1, R2 and R3. A plurality of batteries are stacked on one another to constitute the assembled battery 11. Each of the batteries is a rechargeable DC electric power supply, and is, for example, a secondary battery such as a nickel hydride battery, a lithium-ion battery or the like. An electric power that is generated by the motive power output device 50 as well as an electric power that is supplied from an electric power supply outside the vehicle 1 and that is input from the inlet 90 is stored, in the assembled battery 11. The same holds true for the assembled battery 12 as well as the assembled battery 11. Incidentally, in the present embodiment, an example in which the electric storage device 10 includes the two assembled batteries 11 and 12 will be described. However, the number of assembled batteries included in the electric, storage device 10 should not necessarily be two. Three or more assembled batteries may be included in the electric storage device 10. Besides, each of the assembled batteries should not necessarily be configured as the plurality of the batteries that are stacked on one another, but may be configured as a single battery. Besides, a large-capacity capacitor can also be adopted as each of the assembled batteries 11 and 12.

Each of the changeover relays R1, R2 and R3 is configured to be changeable over between a first state where the two assembled batteries 11 and 12 are connected in series to each other and a second state where the two assembled batteries 11 and 12 are connected in parallel to each other. The changeover relay R2 is provided between the main relay device 20 and a positive electrode terminal of the assembled battery 11. The changeover relay R3 is provided between the main relay device 20 and a negative electrode terminal of the assembled battery 12. The changeover relay R1 is provided between a node N1 and a node N2. The node N1 is located between the changeover relay R2 and the positive electrode terminal of the assembled battery 11. The node N2 is located between the changeover relay R3 and the negative electrode terminal of the assembled battery 12. The open/closed state of each of the changeover relays R1, R2 and R3 in each of the first state and the second state will be described later. Incidentally, a transistor such as an insulated gate bipolar transistor (an IGBT), a metal oxide semiconductor field effect transistor (a MOSFET) or the like, a mechanical relay, or the like is employed as each of the changeover relays R1, R2 and R3.

The PCU 40 comprehensively refers to an electric power conversion device for driving the motive power output device 50 upon receiving an electric power from the electric storage device 10. For example, the PCU 40 includes an inverter for driving a motor that is included in the motive power output device 50, a converter that steps up a voltage output from the electric storage device 10 and, that supplies the inverter therewith, and the like.

The motive power output device 50 comprehensively refers to a device for driving the driving wheels 60. For example, the motive power output device 50 includes a motor, an engine and the like for driving the driving wheels 60. Besides, through the operation of the motor for driving the driving wheels 60 in a regenerative mode, the motive power output device 50 generates an electric power at the time of braking of the vehicle or the like and outputs the generated electric power to the PCU 40. The PCU 40, the motive power output device 50 and the driving wheels 60 will be comprehensively referred to hereinafter also as "a drive unit". The drive unit is an electric load of the vehicle 1.

The auxiliary load 70 is connected to a positive electrode PL and a negative electrode line NE, which are connected to the electric storage device 10. This auxiliary load 70 comprehensively refers to auxiliaries that operate at the time of external charging. For example, the auxiliary load 70 includes a DC/DC converter that steps down a voltage of the positive electrode line PL to generate an auxiliary voltage, an electrically operated air-conditioner, and the like.

The inlet 90 is configured to be connectable to a charging connector 300 of the DC charging facility 200 for supplying a DC electric power to the vehicle 1. At the time of DC charging, the inlet 90 receives the electric power that is supplied from the DC charging facility 200.

The main relay device 20 is provided between the electric storage device 10 and the drive unit. The main relay device 20 includes a main relay 21 and a main relay 22. The main relay 21 and the main relay 22 are connected to the positive electrode line PL and the negative electrode line NL respectively.

When the main relays 21 and 22 are in an open state, no electric power can be supplied from the electric storage device 10 to the drive unit, so there is established a READY-OFF state where the vehicle 1 cannot run. When the main relays 21 and 22 are in a closed state, an electric power can be supplied from the electric storage device 10 to the drive unit, so there can be established a READY-ON state where the vehicle 1 can run.

The charging relay device 30 is connected between the main relay device 20 and the drive unit. The charging relay device 30 includes a charging relay 31 and a charging relay 32. The charging relay 31 and, the charging relay 32 are connected to the positive electrode line PL and the negative electrode line NL respectively. The charging relays 31 and 32 are rendered in the closed state in the case where the vehicle 1 is charged by the DC charging, facility 200.

By rendering the main relays 21 and 22 in the closed state and rendering the charging relays 31 and 32 in the closed state, there is established a state where the electric storage device 10 can be Charged by the DC, charging facility 200 (referred to hereinafter also as "an external charging state").

Incidentally, in the present embodiment, the charging relay device 30 is connected between the main relay device 20 and the drive unit. However, the charging relay device 30 may be connected between the electric storage device 10 and the main relay device 20.

The monitoring unit 80 includes a voltage sensor 81 and a current sensor 82. The voltage sensor 81 detects an inter-terminal voltage VB of the electric storage device 10, and outputs a detected value thereof to the ECU 100. The current sensor 62 detects a current IB flowing through the electric storage device 10, and outputs a detected value thereof to the ECU 100. In concrete terms, the current sensor 82 detects a charging current that is supplied from the DC charging facility 200 to charge the electric storage device 10, and a discharging current that is supplied from the electric storage device 10 to the drive unit and the like.

The ECU 100 includes a central processing unit (a CPU), a memory, and an input/output buffet, although none of them are shown in the drawing. Signals are input to the ECU 100 front respective sensors and the like, and the ECU 100 outputs control signals to respective pieces of equipment and performs control of the respective pieces of equipment. Incidentally, the control of these pieces of equipment is not necessarily performed through a software process, but can also be performed through a process realized by structuring a dedicated piece of hardware (an electronic circuit).

In concrete terms, the ECU 100 controls the charging of the electric storage device 10. The ECU 100 controls the opening/closing of the changeover relays R1, R2 and R3 that are included in the electric storage device 10, and changes over each of the changeover relays R1, R2 and R3 to either the first state or the second state. Besides, the ECU 100 controls the opening/closing of the main relays 21 and 22 that are included in the main relay device 20. Besides, the ECU 100 controls the opening/closing of the charging relays 31 and 32 that are included in the charging relay device 30.

Furthermore, the ECU 100 carries out a predetermined calculation through the use of a detected value acquired from the monitoring unit 80, and performs various processes. In concrete terms, for example, the ECU 100 learns the inter-terminal voltage VB of the electric storage device 10 in the READY-OFF state, and diagnoses the electric storage device 10 through the use of the learned value. Besides, the ECU 100 stores the detected value acquired from the monitoring unit 80. Incidentally, the ECU 100 according to the present embodiment is equivalent to an example of "the control device" according to the present disclosure.

The DC charging facility 200 supplies a charging electric power (a direct current) to the vehicle 1 via the charging connector 300. The DC charging facility 200 according to the present embodiment can change the supplied voltage (the charging voltage) in supplying the same charging electric power. For example, in supplying the same charging electric power, the DC charging facility 200 can change the supply of the charging electric power at a high voltage (e.g., 800 V), and the supply of the charging electric power at a low voltage (e.g., 400 V), in accordance with a request from the vehicle 1.

An example will be described concretely. For example, in supplying a charging electric power of 160 kW, the DC charging facility 200 supplies the charging electric power at 800 V-200 A in the case where the electric storage device 10 of the vehicle 1 can be charged at 800 V, and supplies the charging electric power at 400 V-400 A in the case where the electric storage device 10 of the vehicle 1 can be charged at 400 V. As the specification of the DC charging facility 200 in the above-mentioned example, the maximum charging electric power is 160 kW, the maximum charging voltage is 800 V, and the maximum charging current is 400 A.

In the present embodiment, the description will be given with reference to an example of the DC charging facility 200 that carries out DC charging at a certain charging electric power or more (e.g., 160 kW). However, a DC charging facility that carries out DC charging with a charging electric power assuming various values can be applied as the DC charging facility 200. Incidentally, DC charging that is carried, out with a certain charging electric power or more is also referred to as "quick charging".

Figure 2:
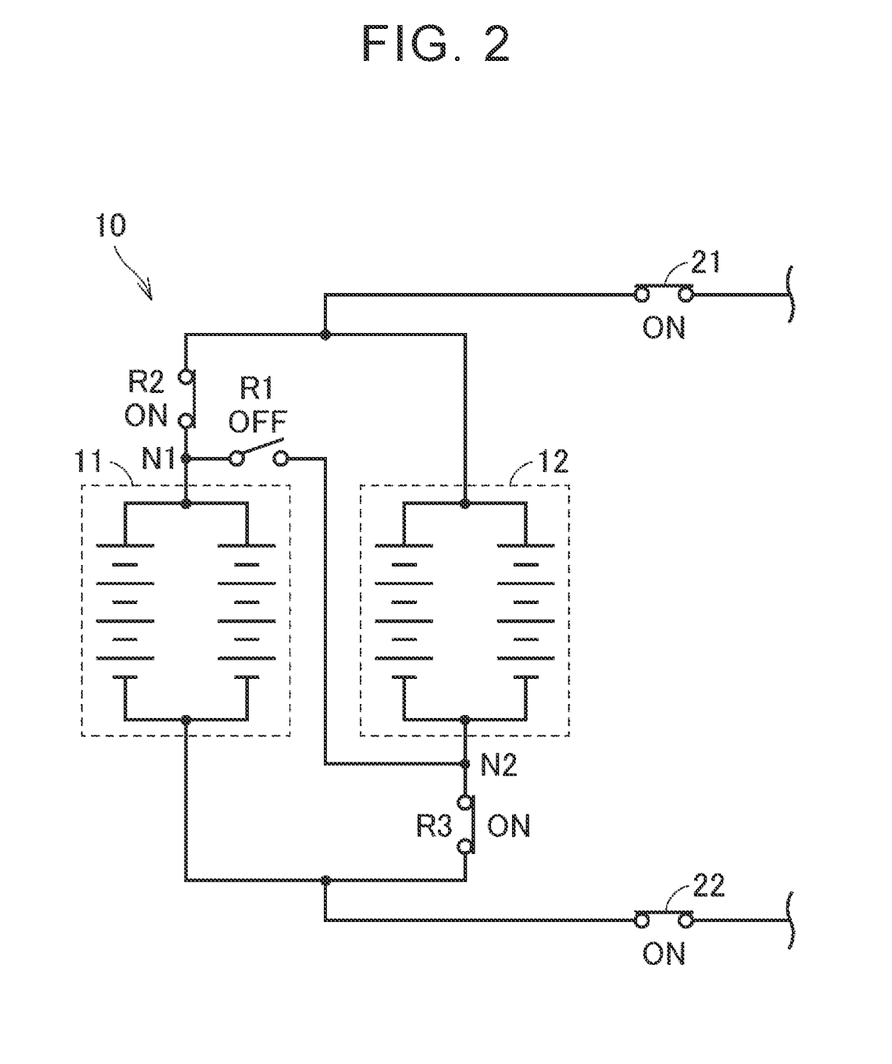
FIG. 2 is a view schematically showing an electric storage device at the time when changeover relays are in a second state.

FIG. 2 is a view schematically showing the electric storage device 10 at the time when the changeover relays R1, R2 and R3 are in the second state. As shown in FIG. 2, the assembled battery 11 and the assembled battery 12 are connected in parallel to each other by rendering the changeover relay R1 in the open state and rendering the changeover relays R2 and R3 in the closed state.

Figure 3:
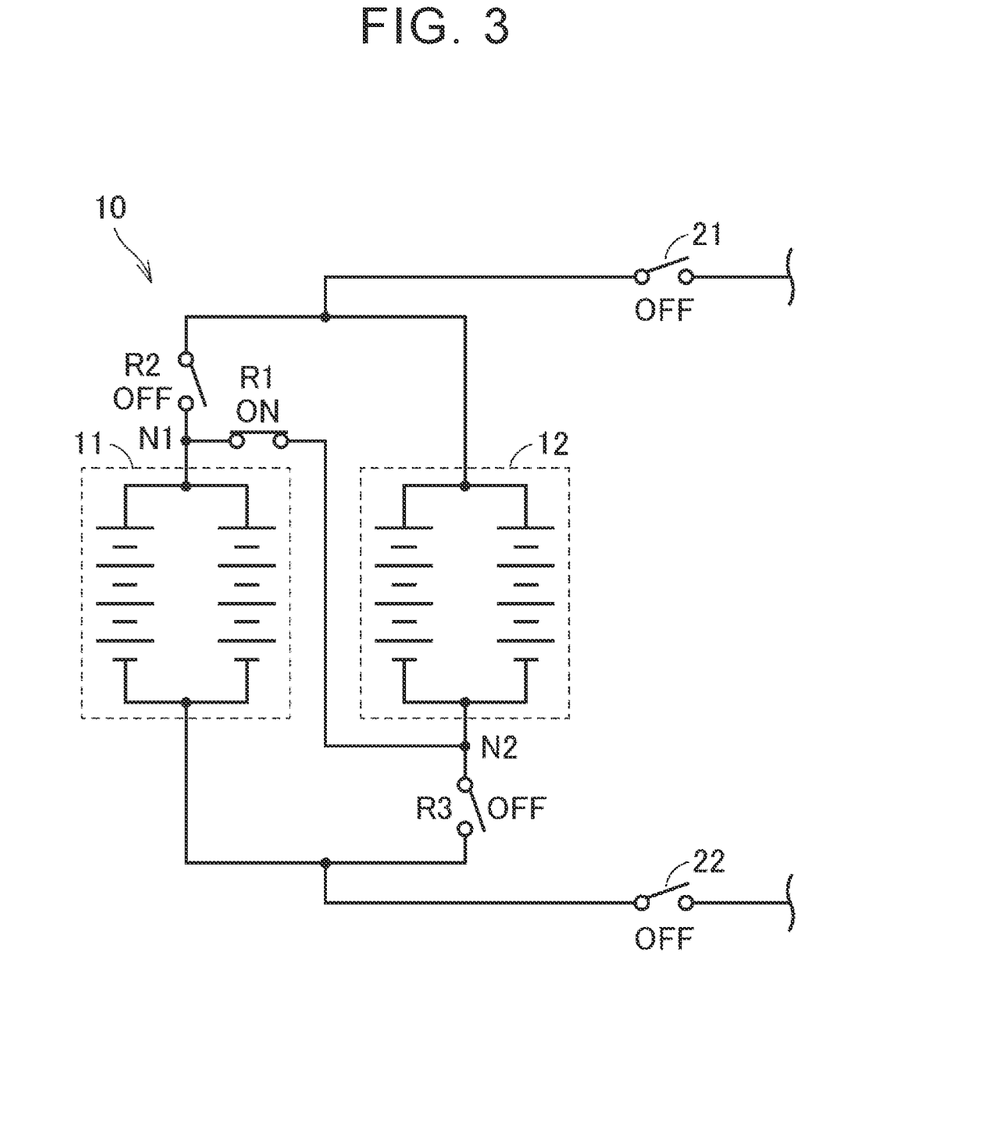
FIG. 3 is a view schematically showing the electric storage device at the time when the changeover relays are in a first state.

FIG. 3 is a view schematically showing the electric storage device 10 at the time when the changeover relays R1, R2 and R3 are in the first state. As shown in FIG. 3, the assembled battery 11 and the assembled battery 12 are connected in, series to each other by rendering the changeover relay R1 in the closed state and rendering the changeover relays R2 and R3 in the open state.

Figure 4:
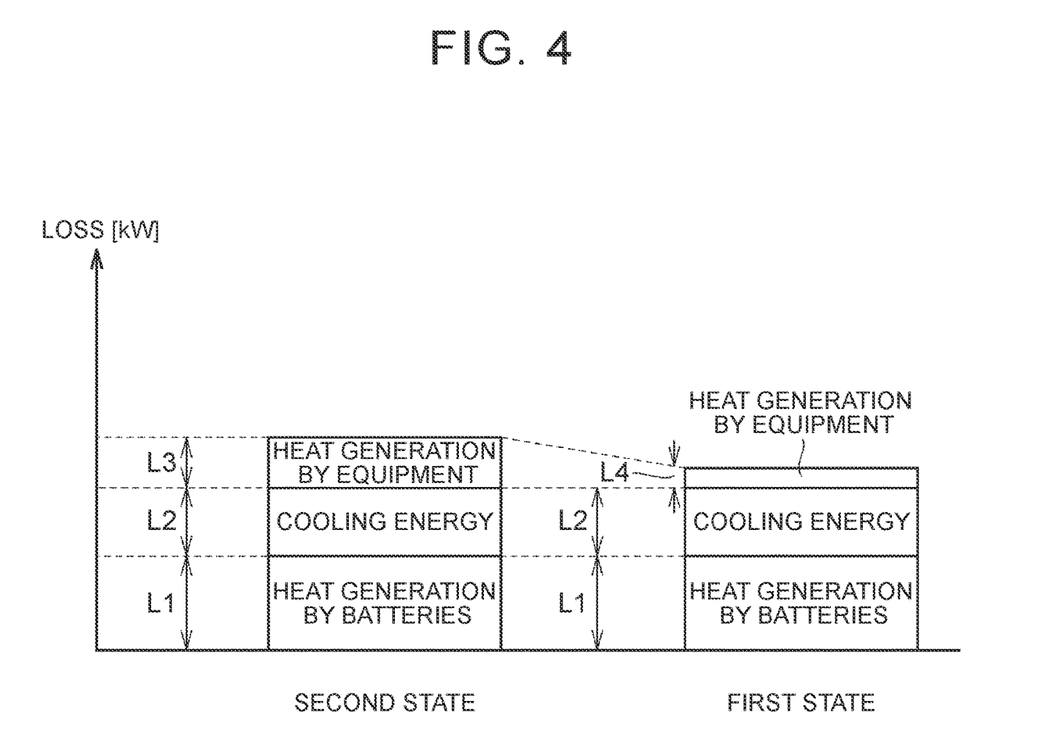
FIG. 4 is a comparison view of a loss of energy in the vehicle ire the case where the vehicle is quickly charged with a certain charging electric power.

FIG. 4 is a comparison view of a loss of energy in the vehicle 1 in the case where quick charging is carried out with a certain charging electric power. FIG. 4 shows the loss of energy in the second state and the loss of energy in the first state. The loss of energy is shown as three separate items, namely, heat generation by the batteries, cooling energy, and heat generation by the pieces of equipment.

Heat generation by the batteries is the sum of thermal losses resulting from heat generation by the respective batteries that are included in the assembled batteries 11 and 12 at the time when the electric storage device 10 is charged. Cooling energy is the energy that is used to suppress heat generation by the aforementioned batteries, for example, to cool the assembled batteries 11 and 12 with a cooling medium. Heat generation by the pieces of equipment is, for example, the sum of heat generation by energized components of the vehicle 1 such as cables, components and the like from the inlet 90 to the electric storage device 10.

As shown in FIG. 4, the loss resulting from heat generation by the batteries is a loss L1 in both the second state and the first state. The loss resulting from cooling energy is a loss L2 in both the second state and the first state. The loss resulting from heat generation by the pieces of equipment is a loss L3 in the second state, and is a loss IA smaller than the loss L3 in the first state (L3>L4).

In the case where the assembled batteries 11 and 12 are connected in series to each other, the inter-terminal voltage VB of the electric storage device 10 is higher than in the case where the assembled batteries 11 and 12 are connected in parallel to each other. Therefore, in the case where the vehicle 1 is charged with the same charging electric power in the READY-OFF state, charging is started with the assembled batteries 11 and 12 connected in series to each other. Therefore, the charging voltage is higher and hence the energization current can be made smaller than in the case where the vehicle 1 is charged with the assembled batteries 11 and 12 connected in parallel to each other. Therefore, the amount of heat generation by the energized components of the vehicle 1 is smaller during the charging of the vehicle 1 in the first state than during the charging of the vehicle 1 in the second state. Therefore, the loss L4 resulting from heat generation by the pieces of equipment in the first state is smaller than the loss L3 resulting from heat generation by the pieces of equipment in the second state.

As described hitherto, it is apparent that the loss of energy is smaller and the charging efficiency is higher in the first state than in the second state in the case where quick charging is carried out with the same charging electric power.

Thus, the charging apparatus according to the present embodiment renders the changeover relays R1, R2 and R3 in the first state in the case where the main relays 21 and 22 are in the open state. Therefore, the changeover relays R1, R2 and R3 are in the first state when the charging of the vehicle 1 is started. Thus, the energization current can be made smaller than in the case where quick charging is carried out with the changeover relays R1, R2 and R3 in the second state. Therefore, heat generation by the energized components can be suppressed, and the charging efficiency can be enhanced. Incidentally, the state of the changeover relays R1, R2 and R3 at the time when the main relays 21 and 22 are in the open state and a plug-in operation has not been performed will be hereinafter referred to also as "a default state".

Figure 5:
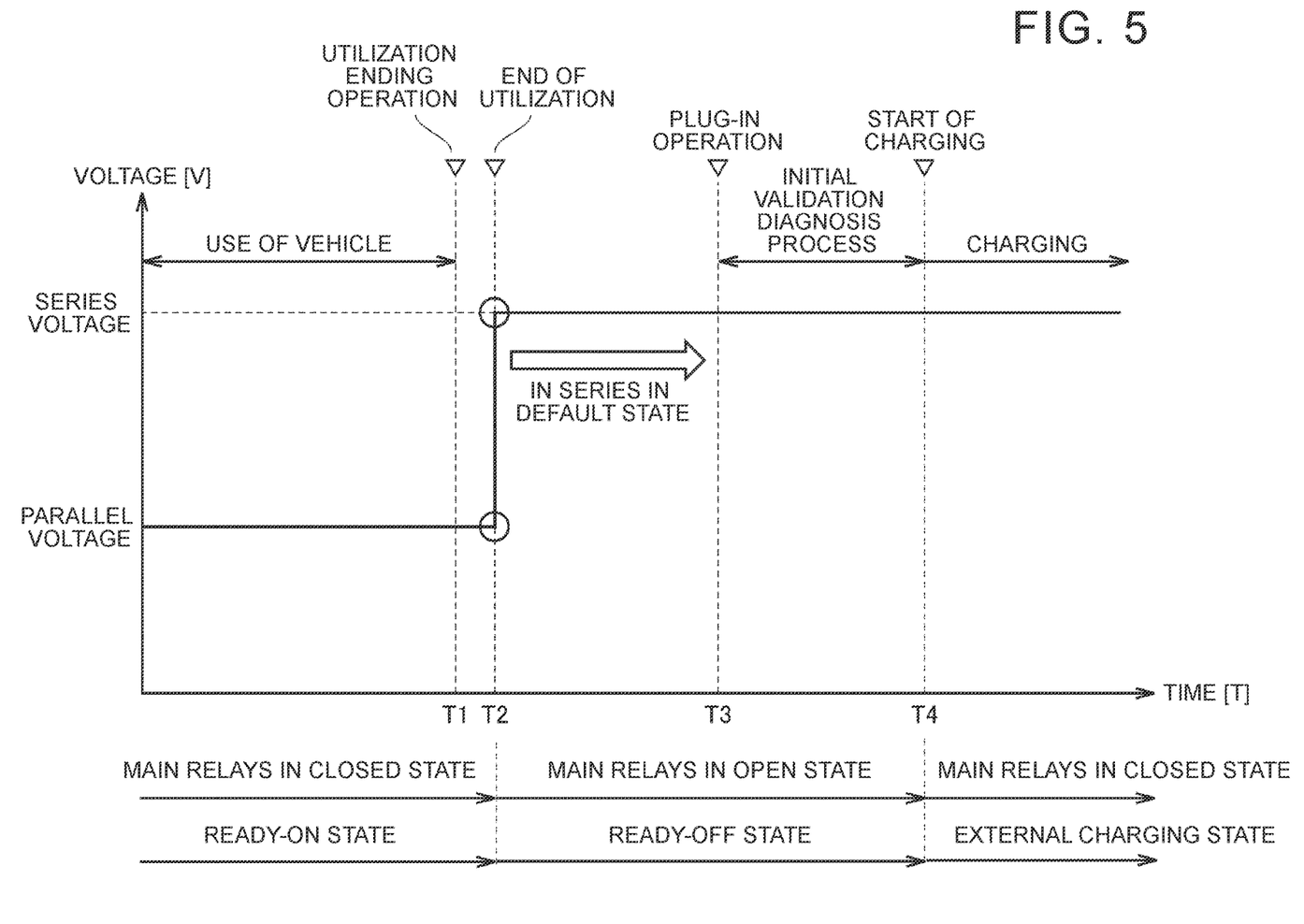
FIG. 5 is a timing chart (No. 1) showing how an inter-terminal voltage of the electric storage device changes.

FIG. 5 is a timing chart showing how the inter-terminal voltage VB of the electric storage device 10 changes. In FIG. 5, the axis of abscissa represents time, and the axis of ordinate represents voltage, "Parallel voltage" represented by the axis of ordinate indicates the inter-terminal voltage VB of the electric storage device 10 at the time when the assembled batteries 11 and 12 are connected in parallel to each other, and "series voltage" represented by the axis of ordinate indicates the inter-terminal voltage VB of the electric storage device 10 at the time when the assembled batteries 11 and 12 are connected in series to each other.

In the example shown in FIG. 5, the vehicle 1 is used until a timing T1 (with the main relays 21 and 22 in the closed state), and a utilization ending operation for the vehicle 1 is performed at the timing T1. The utilization ending operation is an operation that is performed on the vehicle 1 by a user to change over the vehicle 1 from the READY-ON state to the READY-OFF state.

When the main relays 21 and 22 are rendered in the open state at a timing T2 as a result of the performance of the utilization ending operation at the timing T1, the changeover relays R1, R2 and R3 are changed over from the second state to the first state.

As described above, when the main relays 21 and 22 are rendered in the open state, namely, the READY OFF state is established as a result of the performance of the utilization ending operation, the changeover relays R1, R2 and R3 are rendered in the first state. In other words, the default state is the first state.

The plug-in operation for connecting the charging connector 300 of the DC charging facility 200 to the inlet 90 is performed at a timing T3. Incidentally, the plug-in operation according to the present embodiment is equivalent to an example of "the operation for charging" according to the present disclosure.

When the plug-in operation is performed, an initial validation of the electric storage device 10 and a diagnosis process thereof are performed from the timing T3 to a timing T4. The initial validation is a process of confirming whether or not charging can be normally carried out. The diagnosis process is a process of diagnosing whether or not the electric storage device 10 is normal. In the present embodiment, a first diagnosis process and a second diagnosis process are performed as the diagnosis process.

The diagnosis process of the electric storage device 10 is performed with the changeover relays R1, R2 and R3 in the first Mate, because the default state is fixed to the first state. As described hitherto, series connection of the assembled batteries 11 and 12 is determined in performing the diagnosis process, so the diagnosis process can be performed on the premise that the assembled batteries 11 and 12 are connected in series to each other. The details of the initial validation and the diagnosis process will be described later.

The charging of the vehicle 1 is started at the timing T4 after the performance of the initial validation of the electric storage device 10 and the diagnosis process thereof. The charging of the vehicle 1 is also carried out with the changeover relays R1, R2 and R3 in the first state. Therefore, the inter-terminal voltage VB of the electric storage device 10 is higher than in the case where the vehicle 1 is charged in the second state. Therefore, in carrying out quick charging with the same charging electric power, the energization current can be made smaller than in the case where the vehicle 1 is charged in the second state, so heat generation by the energized components can be suppressed. Therefore, the charging efficiency can be enhanced.

Figure 6:
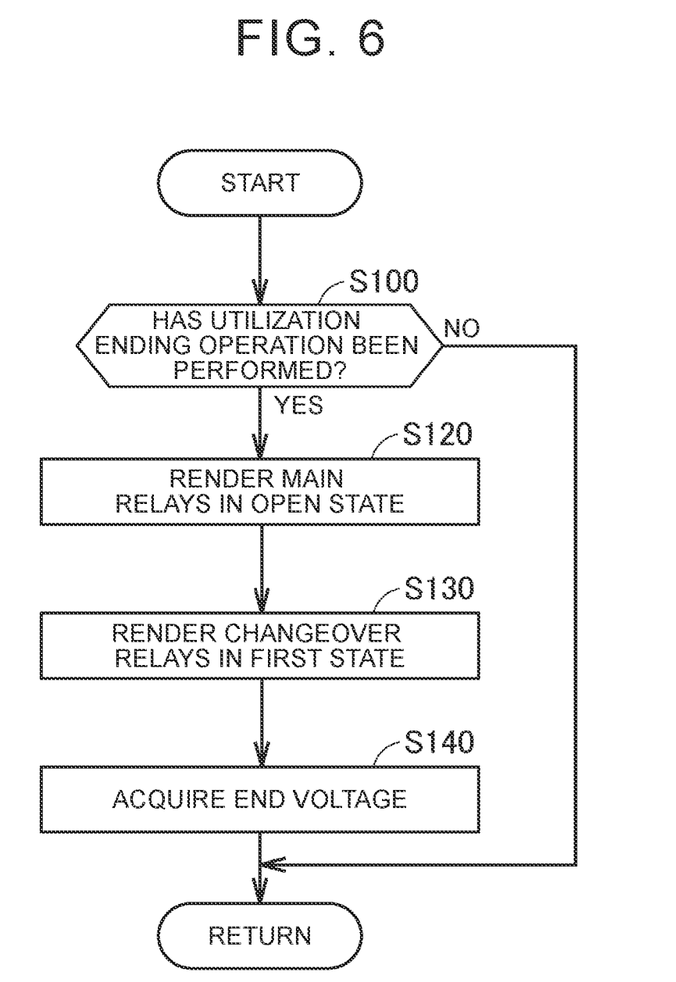
FIG. 6 is a flowchart showing a process that is performed by an ECU from the time of use of the vehicle to the time of the end of utilization thereof.

FIG. 6 is a flowchart showing a process that is performed by the ECU 100 from the time of use of the vehicle 1 to the time, of the end of utilization thereof. This process is started by the ECU 100 when the vehicle 1 shifts from the READY-OFF state to the READY-ON state. Incidentally, although respective steps in the flowchart shown in FIG. 6 are realized through a software process by the ECU 100, one or some of the steps may be realized by a pieces of hardware (an electric circuit) prepared in the ECU 100. The same holds true for FIGS. 7 and 9.

The ECU 100 starts the process when the vehicle 1 shifts from the READY-OFF state to the READY-ON state. The ECU 100 determines whether or not the utilization ending operation for the vehicle 1, more specifically; an operation fir changing over the vehicle 1 to the READY-OFF state has been performed (step 100, step will be hereinafter abbreviated as "S").

If it is determined that the utilization, ending operation has not been performed (NO in S100), the ECU 100 returns the process.

If it is determined that the utilization ending operation has been performed (YES in S100), the ECU 100 changes over the main relays 21 and 22 to the open state (S120), Due to the changeover of the main relays 21 and 22 to the open state, no electric power can be supplied from the electric storage device 10 to the drive unit, and the vehicle 1 assumes the READY-OFF state.

Subsequently, the ECU 100 renders the changeover relays R1, R2 and R3 in the first state (S130). In concrete terms, the ECU 100 holds the changeover relays R1, R2 and R3 in the first state when the changeover relays R1, R2 and R3 have already been in the first state, and changes over the changeover relays R1, R2 and R3 to the first state when the changeover relays R1, R2 and R3 are in the second state. Thus, in the READY-OFF state, the changeover relays R1, R2 and R3 are in the first state. Therefore, when the plug-in operation is performed with the vehicle 1 in the READY-OFF state, the changeover relays R1, R2 and R3 are in the first state in the default state.

The ECU 100 acquires and stores an inter-terminal voltage (hereinafter referred to also as "an end voltage") of the electric storage device 10 at the time of the end of utilization of the vehicle 1 (S140). The end voltage is used to perform a diagnosis on a self-discharge amount of the electric storage device 10, which will be described later.

Figure 7:
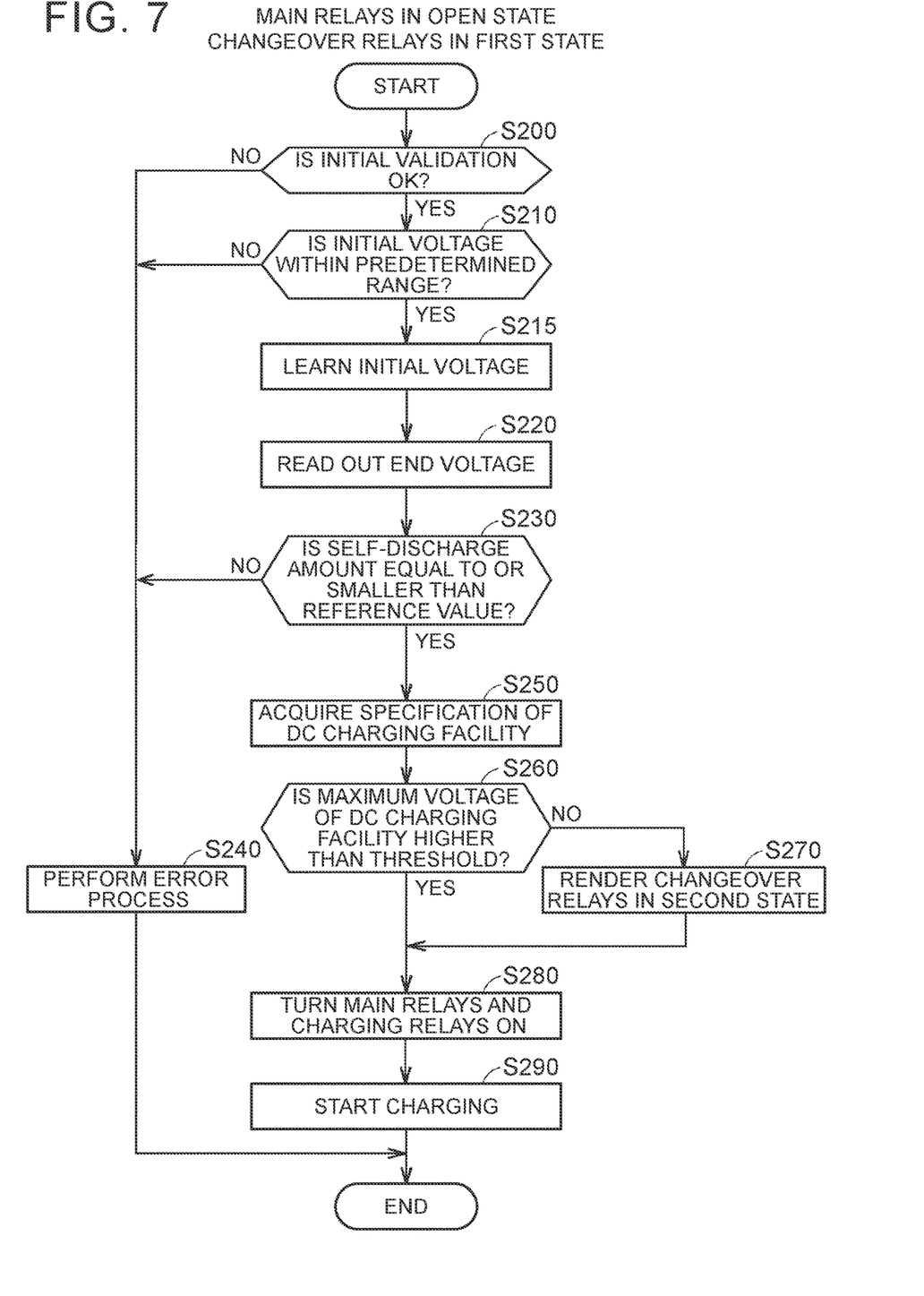
FIG. 7 is a flowchart (No. 1) showing a process that is performed by the ECU when a operation is performed.

FIG. 7 is a flowchart showing a process that is performed by the ECU 100 when the plug-in operation is performed. This process is performed every time the operation is performed on the vehicle 1. Incidentally, in the following description of FIG. 7, an example in which the plug-in operation is performed when the vehicle 1 is in the READY-OFF state will be described.

When the plug-in operation is performed, more specifically, when the charging connector 300 of the DC charging facility 200 is connected to the inlet 90 of the vehicle 1, the ECU 100 performs the initial validation (S200). The initial validation includes, for example, a check on contact between the inlet 90 and the charging connector 300, a self-check on whether or not there is an, electric malfunction in the vehicle 1, and the like.

If it is determined that there is no abnormality as a result of the initial validation (YES in S200), the ECU 100 performs the first diagnosis process for diagnosing the inter-terminal voltage VB of the electric storage device 10. As the first diagnosis process, the ECU 100 acquires the inter-terminal voltage VB of the electric storage device 10 from the monitoring unit 80, and determines whether or not the inter-terminal voltage VB is within a predetermined range (S210). The inter-terminal voltage VB of the electric storage device 10 that is acquired in S210 will be hereinafter referred to also as "an initial voltage", in the present embodiment, the changeover relays R1, R2 and R3 are in the first state in the READY-OFF state. Therefore, the changeover relays R1, R2 and R3 are in the first state in acquiring the initial voltage. Because the state of the changeover relays is determined as, the first state, the predetermined appropriate range presuming the first state can be set.

When the state of the changeover relays R1, R2 and R3 has not been determined in acquiring the initial voltage, the predetermined range needs to be set in consideration of the inter-terminal voltage VB of the electric storage device 10 in both the first state and the second state. Therefore, the predetermined range needs to be set wide. Therefore, the accuracy of the first diagnosis is assumed to decrease. However, the state of the changeover relays R1, R2 and R3 in, acquiring the initial voltage is determined as the first state, so the accuracy of the first diagnosis process can be enhanced.

Besides, in the present embodiment, the ECU 100 learns an initial voltage (S215 that will be described later). The ECU 100 determines a predetermined range based, on the learned initial voltage, and determines that the initial voltage is an abnormal value when the initial voltage is outside the predetermined range. As a concrete example, the predetermined range is set as follows. The ECU 100 learns the voltage. Then, the ECU 100 determines a certain range from an average of learned initial voltages for each SOC, and sets the certain range from the average as the predetermined range. Thus, due to the setting of the predetermined range through learning, an accurate range reflecting the characteristics of the electric storage device 10 can be set as the predetermined range. Incidentally, a certain range from a fixed value for each SOC may be set as the predetermined range.

In the present embodiment, the determination in S210 is made depending, on whether or not the initial voltage falls within the predetermined range set through the previous learning.

If it is determined that the initial voltage falls within the predetermined range (YES in S210), the ECU 100 learns the initial voltage (S215).

Subsequently, the ECU 100 reads out an end voltage stored at the time of the end of utilization of the vehicle 1 (S220), and performs the second diagnosis process for diagnosing the self-discharge amount of the electric storage device 10 (S230). The second diagnosis process is a process of diagnosing the self-discharge amount of the electric storage device 10 during a neglect time period from the time of the end of utilization of the vehicle 1 to the time of charging of the vehicle 1. As a concrete example, the neglect time period is a period from the timing T2 to the timing T3 in FIG. 5.

In S230, the ECU 100 determines whether or not the self-discharge amount is equal to or smaller than a reference value, as the second diagnosis process (S230). The self-discharge amount is expressed as, for example, an equation (1) shown below.

$$\text{Self-discharge amount} = (\text{end voltage} - \text{initial voltage})/\text{neglect time period} \quad (1)$$

If the self discharge amount is equal to or smaller than the reference value (YES in S230), the ECU 100 acquires a specification of the DC charging facility 200 (S250). In the present embodiment, a maximum charging voltage that can be supplied by the DC charging facility 200 is acquired as the specification of the DC charging facility 200.

The ECU 100 determines whether or not the maximum charging voltage of the DC charging facility 200 is larger than a threshold (S260). The threshold is a value that is arbitrarily set between an inter-terminal voltage VB1 of the electric storage device 10 at the time when the assembled batteries 11 and 12 are connected in series to each other and an inter-terminal voltage VB2 of the electric storage device 10 at the time when the assembled batteries 11 and 12 are connected in parallel to each other. That is, the processing of S260 is performed to determine whether or not the maximum charging voltage of the DC charging facility 200 corresponds to a voltage that allows the electric storage device 10 to be charged when the assembled batteries 11 and 12 are connected in series to each other.

If it is determined that the maximum charging voltage of the DC charging facility 200 is equal to or smaller than the threshold (NO in S260), the ECU 100 changes over the changeover relays R1, R2 and R3 to the second state (S270), and causes the process to proceed to S280.

If it is determined that the maximum charging voltage of the DC charging facility 200 is larger than the threshold (YES in S260), the ECU 100 renders the main relays 21 and 22 and, the charging relays 31 and 32 in the closed state (S280), and starts charging the vehicle 1 (S290).

If it is determined that there is an abnormality as a result of the initial validation (NO in S200), if it is determined that the initial voltage is not within the predetermined range (NO in S210), or if it is determined that the self-discharge amount is not equal to or smaller than the reference value (NO in S230), the ECU 100 performs an error process (S240). As the error process, for example, the ECU 100 performs a process of prohibiting the vehicle 1 from being charged.

As described above, the charging apparatus according to the present embodiment renders the changeover relays R1, R2 and R3 in the first state when the main relays 21 and 22 are in the open state. Thus, when the charging of the vehicle 1 is started, the changeover relays R1, R2 and R3 are in the first state. The inter-terminal voltage VB1 of the electric storage device 10 in the first state is higher than the inter-terminal voltage VB2 of the electric storage device 10 in the second state (VB1>VB2). Therefore, in the case where quick charging is carried out with the same charging electric power, the charging voltage is higher and the energization current can be made smaller when quick charging is carried out in the first state than when quick charging is carried out in the second state. In consequence, the loss resulting from heat generation by the energized components can be reduced, and the charging efficiency can be enhanced.

Modification Example

Figure 8:
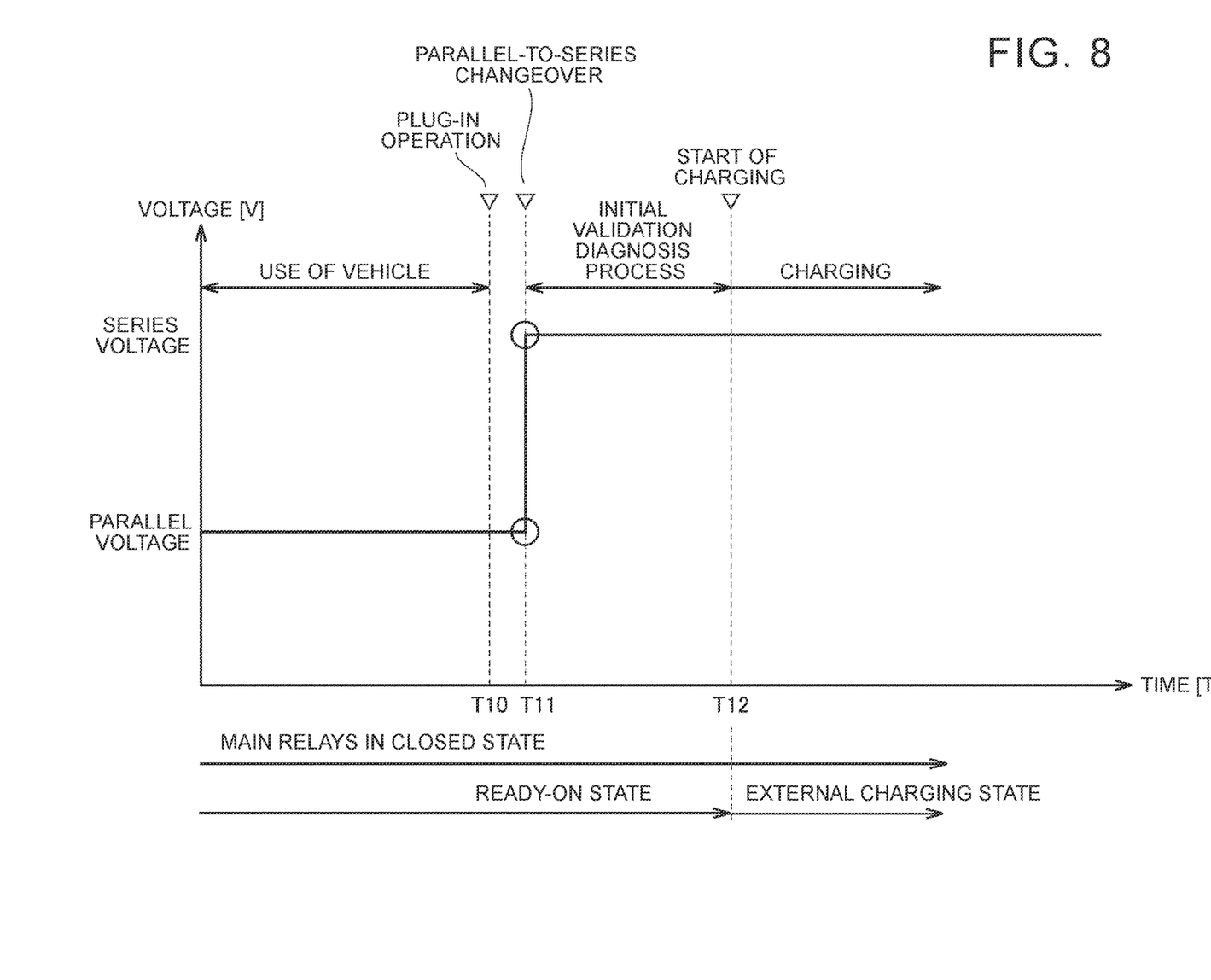
FIG. 8 is a timing chart (No. 2) showing how the inter-terminal voltage of the electric storage device changes.

In the embodiment, the example in, which the plug-in operation is performed in the READY-OFF state has been described. That is, the example in which the vehicle 1 shifts from the READY-OFF state to the external charging state through the plug-in operation has been described. However, in an electrically operated vehicle, the plug-in operation may be performed with the vehicle 1 in the READY-ON state. That is, the vehicle 1 may shift from the READY-ON state to the external charging state through the plug-in operation. In the modification example, an example in which the plug-in operation is performed in the READY-ON state will be described, FIG. 8 is a timing chart showing how the inter-terminal voltage VB of the electric storage device 10 changes. In FIG. 8, the axis of abscissa represents time, and the axis of ordinate represents voltage. "Parallel voltage" represented by the axis of ordinate indicates the inter-terminal voltage VB of the electric storage device 10 at the time when the assembled batteries 11 and 12 are connected in parallel to each other, and "series voltage" represented by the axis of ordinate indicates the inter-terminal voltage VB of the electric storage device 10 at the time when the assembled batteries 11 and 12 are connected in series to each other.

In the example shown in FIG. 8, the vehicle 1 is, used (with the main relays 21 and 22 in the closed state) until a timing T10, and the plug-in operation is performed at the timing T10. In concrete terms, for example, a case where the running vehicle 1 is stopped and the plug-in operation is performed while maintaining the READY-ON state at the timing T10 is assumed.

When the plug-in operation is performed at the timing T10, the changeover relays R1, R2 and R3 are changed over from the second state to the first state at a timing T11 in the wake of the plug-in operation. As described hitherto, even in the case where the plug-in operation is performed in the READY-ON state, the changeover relays R1, R2 and R3 are changed over to the first state. Incidentally, in the READY-ON state, when the plug-in operation is performed, the changeover relays R1, R2 and R3 may be in the first state. In this case, the first state is maintained.

Subsequently, the initial validation of the electric storage device 10 and the diagnosis process thereof are performed from the timing T11 to a timing T12. The diagnosis process of the electric storage device 10 is performed with the changeover relays R1, R2 and R3 in the first state. As described hitherto, since series connection of the assembled batteries 11 and 12 is determined in performing the diagnosis process, the diagnosis process can be performed on the premise that the assembled batteries 11 and 12 are connected in series to each other.

The charging of the vehicle 1 is started at the timing T12 after the performance of the initial validation of the electric storage device 10 and the diagnosis process thereof. The charging of the vehicle 1 is also carried out with the changeover relays R1, R2 and R3 in the first state, so the inter-terminal voltage VB of the electric storage device 10 is higher than in the case where the vehicle 1 is charged in the second state. Therefore, in the case where quick charging is carried out with the same charging electric power, the energization current can be made smaller than when the vehicle 1 is charged in the second state. As a result, heat generation by the energized components can be suppressed. Therefore, the charging efficiency can be enhanced.

Figure 9:
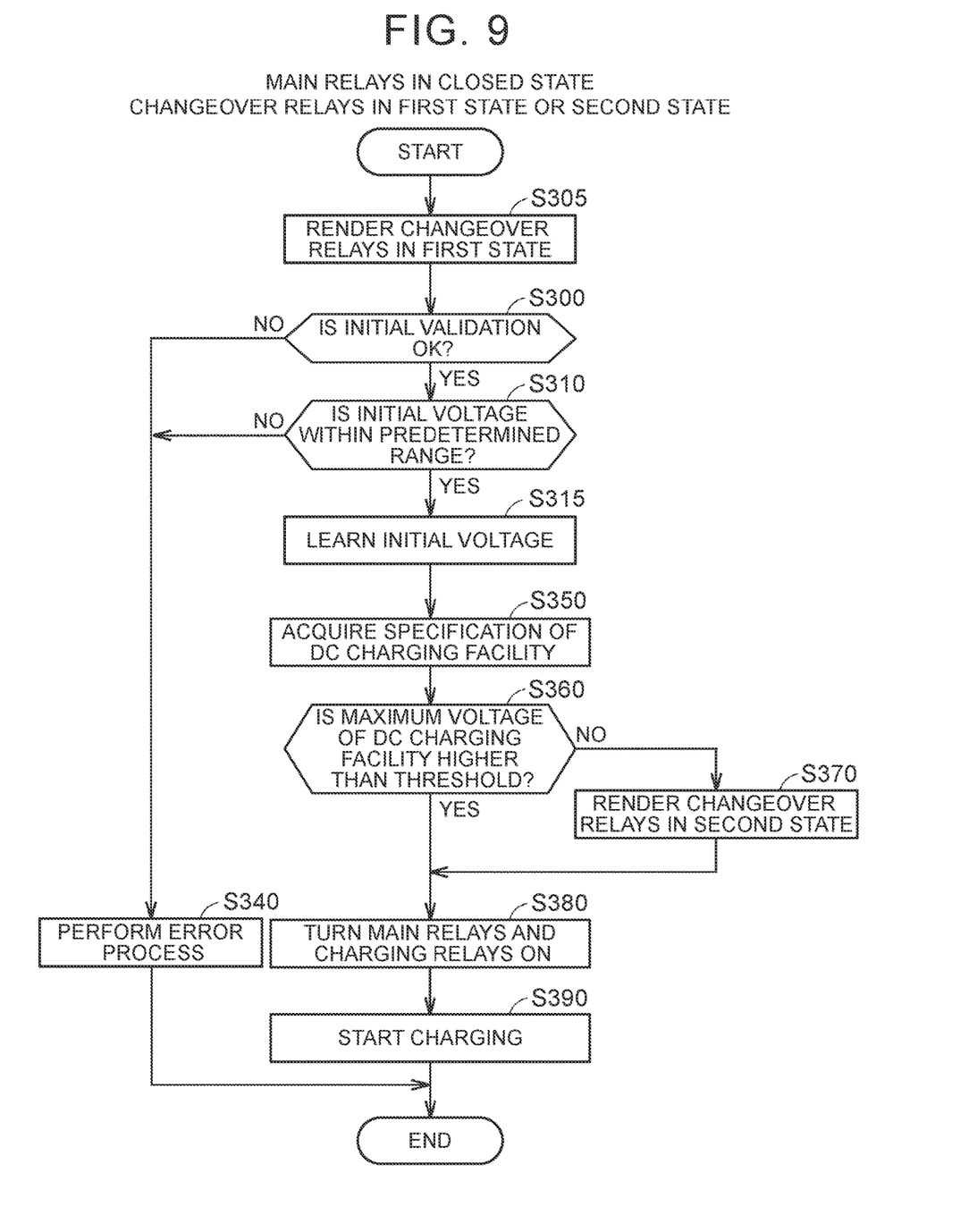
FIG. 9 is a flowchart (No. 2) showing a process that is performed by the ECU when the plug-in operation is performed.

FIG. 9 is a flowchart shoving a process that is performed by the ECU 100 when the plug-in operation is performed. This process is performed every time the plug-in operation is performed on the vehicle 1. Incidentally, in the following description of FIG. 9, an example in which the plug-in operation is performed when the vehicle 1 is in the READY-ON state will be described.

The flowchart shown in FIG. 9 is obtained by adding S305 to the flowchart of FIG. 7 and removing S220 and S230 therefrom. The other respective steps are identical to the respective steps in the flowchart of FIG. 7, so the description thereof will not be repeated.

When the plug-in operation is performed, the ECU 100 renders the changeover relays R1, R2 and R3 in the first state (S305). In the case where the vehicle 1 is in the READY-ON state, the changeover relays R1, R2 and R3 are in either the second state or the first state. Even when the changeover relays R1, R2 and R3 are in the second state through the processing of S305, the changeover relays R1, R2 and R3 are changed over to the first state in the wake of the plug-in operation. In the case where the changeover relays R1, R2 and R3 are in the first state when the plug-in operation is performed, the changeover relays R1, R2 and R3 are held in the first state.

In the modification example, the second diagnosis process is not performed because of the following reason. In the case where the plug-in operation is performed in the READY-ON state, the utilization ending operation has not been performed, so there is no end voltage. Therefore, the self-discharge amount cannot be diagnosed.

As described above, in the modification example, the changeover relays R1, R2 and R3 are rendered in the first state in the case there the plug-in operation is performed with the vehicle 1 in the READY-ON state. Thus, when the charging of the vehicle 1 is started, the changeover relays R1, R2 and R3 are in the first state. The inter-terminal voltage VB1 of the electric storage device 10 in the first state is higher than the inter-terminal voltage VB2 of the electric storage device 10 in the second state. In the case where quick charging is carried out with the same charging electric power, the charging voltage is higher and the energization current can be made smaller when quick charging is carried out in the first state than when quick charging is carried out in the second state. In consequence, the loss resulting from heat generation by the energized components can be reduced, and the charging efficiency can be enhanced.

The embodiment disclosed herein should be considered to be exemplary in every respect and non-restrictive. The scope of the present disclosure is defined not by the foregoing description of the embodiment but by the claims. The present disclosure is intended to encompass all the alterations that are equivalent in significance and scope to the claims.

What is claimed is:

1. A charging apparatus comprising:
   a plurality of batteries;
   a set of relays that can be changed over between a first state where the plurality of the batteries are connected in series to one another and a second state where the plurality of the batteries are connected in parallel to one another;
   an electric storage device that includes the plurality of batteries and the set of relays, the electric storage device is configured to be chargeable by receiving an electric power that is supplied from an electric power supply outside a vehicle;
   a main relay that is provided between the electric storage device and an electric load of the vehicle, the main relay includes a first relay and a second relay, the first relay is connected to a positive electrode line of the plurality of batteries and the second relay is connected to a negative electrode line of the plurality of batteries; and
   a control device that is configured to control opening/closing of the set of relays, wherein
   the control device is configured to render the relay in the first state when the main relay is in an open state.

2. The charging apparatus according to claim 1, wherein the control device is configured to render the main relay in the open state when a utilization ending operation for the vehicle is performed.

3. The charging apparatus according to claim 1, wherein the control device is configured to render the set of relays in the first state when the main relay is in a closed state and an operation for charging the electric storage device is performed.

4. The charging apparatus according to claim 1, further comprising a voltage sensor that detects a voltage of the electric storage device, wherein the control device is configured to charge the electric storage device when the voltage of the electric storage device is within a predetermined range in a case where the set of relays is in the first state.

5. The charging apparatus according to claim 4, wherein:
   the control device is configured to learn the voltage of the electric storage device with the main relay in the open state; and
   the predetermined range is determined based on the learned voltage.

* * * * *